United States Patent
Shijoh

(10) Patent No.: US 10,084,939 B2
(45) Date of Patent: Sep. 25, 2018

(54) IMAGE PROCESSING APPARATUS, IMAGE PROCESSING METHOD, AND NON-TRANSITORY COMPUTER-READABLE STORAGE MEDIUM

(71) Applicant: Takako Shijoh, Kanagawa (JP)

(72) Inventor: Takako Shijoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/439,197

(22) Filed: Feb. 22, 2017

(65) Prior Publication Data

US 2017/0272612 A1 Sep. 21, 2017

(30) Foreign Application Priority Data

Mar. 18, 2016 (JP) .................................. 2016-056331
Dec. 28, 2016 (JP) .................................. 2016-255941

(51) Int. Cl.
| | |
|---|---|
| H04N 1/40 | (2006.01) |
| G06K 15/00 | (2006.01) |
| H04N 1/00 | (2006.01) |
| H04N 1/41 | (2006.01) |
| H04N 1/409 | (2006.01) |
| H04N 1/58 | (2006.01) |

(52) U.S. Cl.
CPC ..... *H04N 1/40062* (2013.01); *H04N 1/00816* (2013.01); *H04N 1/4092* (2013.01); *H04N 1/40093* (2013.01); *H04N 1/41* (2013.01); *H04N 1/58* (2013.01); *H04N 2201/0094* (2013.01)

(58) Field of Classification Search
CPC ........... H04N 1/40062; H04N 1/40093; H04N 1/4092; H04N 1/41; H04N 1/58; H04N 2201/0094
USPC .......................... 358/3.24, 2.1, 1.9, 1.15, 1.2
See application file for complete search history.

(56) References Cited

U.S. PATENT DOCUMENTS

| | | | |
|---|---|---|---|
| 2014/0226177 A1 | 8/2014 | Shijoh | |
| 2016/0014299 A1* | 1/2016 | Saka | G06K 9/00456 358/1.2 |

(Continued)

FOREIGN PATENT DOCUMENTS

| | | |
|---|---|---|
| JP | 7-240842 | 9/1995 |
| JP | 2004-220340 | 8/2004 |
| JP | 2007-189275 | 7/2007 |

*Primary Examiner* — Quang N Vo
(74) *Attorney, Agent, or Firm* — Harness, Dickey & Pierce, P.L.C.

(57) ABSTRACT

An image processing apparatus includes a memory and at least one processor or circuitry or a combination thereof. The memory is configured to store determination conditions. The at least one processor or circuitry or the combination thereof is configured to acquire image data and extract a feature element from the image data. The at least one processor or circuitry or the combination thereof is further configured to determine whether the extracted feature element satisfies conditions defined in the determination conditions. The at least one processor or circuitry or the combination thereof is further configured to set an area with reference to an extracted feature element satisfying the conditions based on the determination conditions. The at least one processor or circuitry or the combination thereof is further configured to set an attribute of the area based on the determination conditions.

14 Claims, 15 Drawing Sheets

(56) References Cited

U.S. PATENT DOCUMENTS

2016/0028921 A1* 1/2016 Thrasher .............. H04N 1/4092
                                                          358/519
2016/0142560 A1   5/2016 Shijoh

* cited by examiner

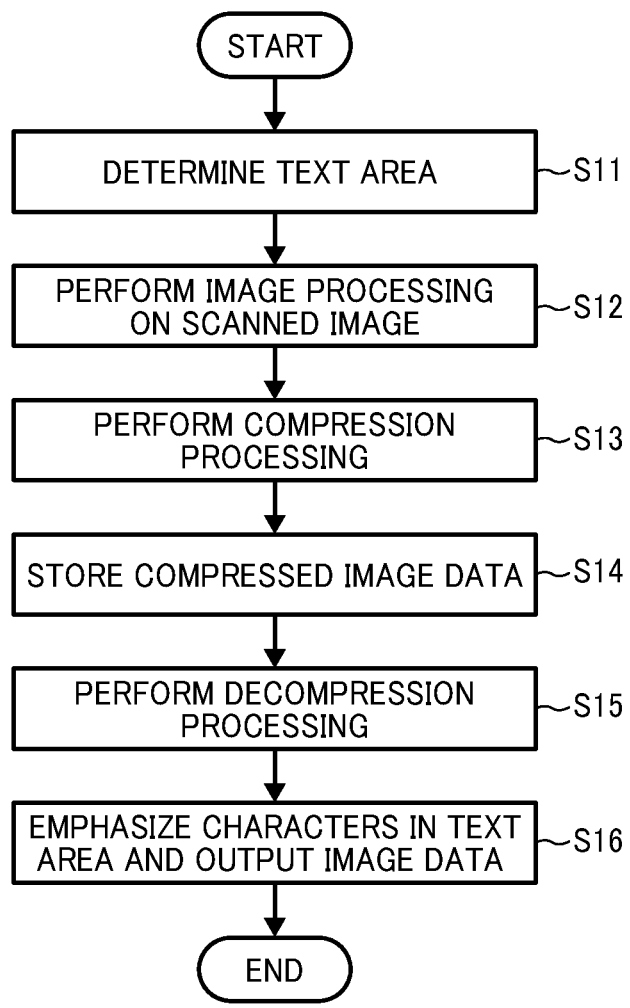

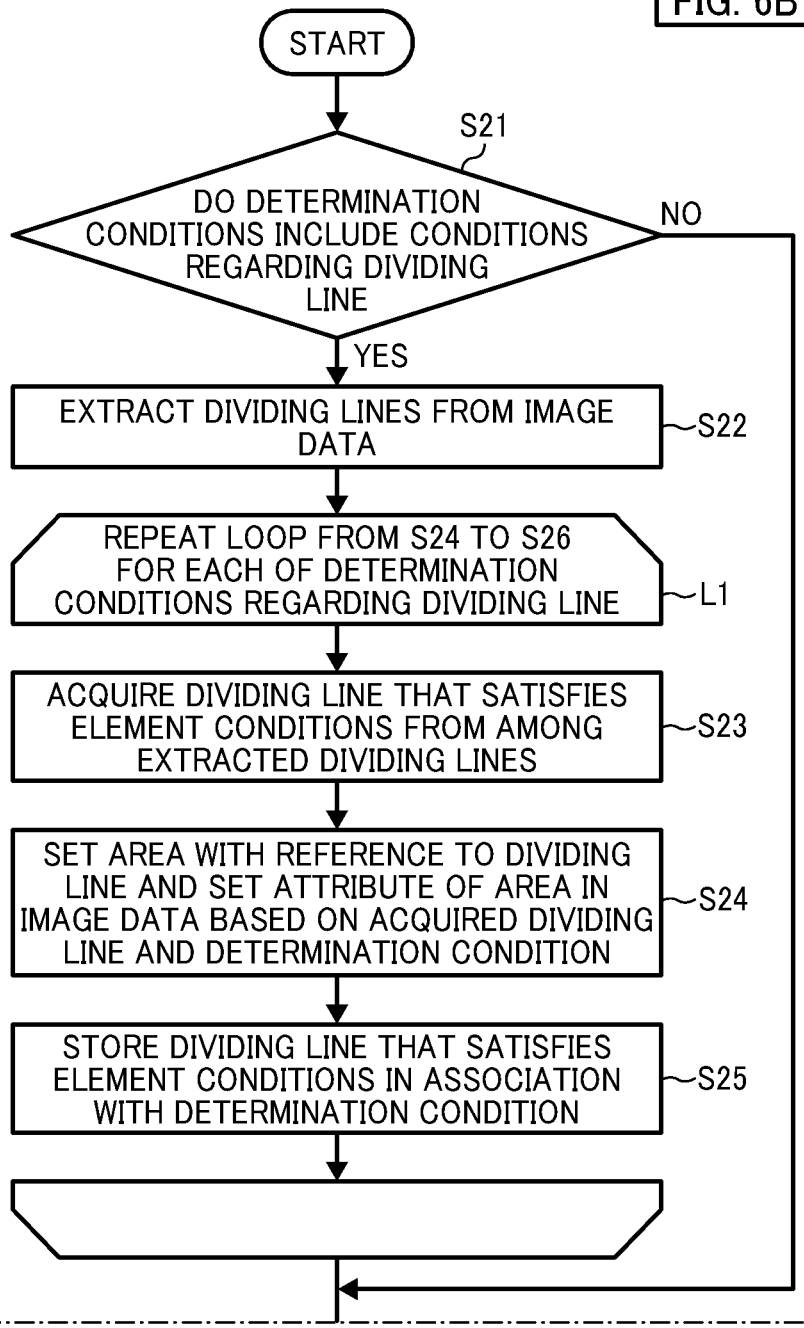

IMAGE PROCESSING APPARATUS, IMAGE PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2016-056331, filed on Mar. 18, 2016 and 2016-255941, filed on Dec. 28, 2016 in the Japan Patent Office, the entire disclosures of which are hereby incorporated by reference herein.

BACKGROUND

Technical Field

The present disclosure relates to an image processing apparatus, a method for processing an image, and a non-transitory computer-readable storage medium.

Description of the Related Art

An image processing technique is known that properly identifies a text area in an image to increase a compression ratio for a document containing only text. With this technique, a document file size in reduced.

Further, a technique is known that extracts horizontal and vertical borders from a form and extracts cells based on the extracted borders to perform text recognition for each cell.

Furthermore, a technique is known that detects a background level of an image acquired by scanning a document and detects a character edge in the image using parameters that are changed based on the background level.

SUMMARY

Disclosed herein is an image processing apparatus including a memory and at least one processor or circuitry or a combination thereof. The memory is configured to store determination conditions. The at least one processor or circuitry or the combination thereof is configured to acquire image data and extract a feature element from the image data. The at least one processor or circuitry or the combination thereof is further configured to determine whether the extracted feature element satisfies conditions defined in the determination conditions. The at least one processor or circuitry or the combination thereof is further configured to set an area with reference to an extracted feature element satisfying the conditions based on the determination conditions. The at least one processor or circuitry or the combination thereof is further configured to set an attribute of the area based on the determination conditions.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 5 is a flowchart illustrating steps in an overall operation performed by the image processor according to an embodiment of the present disclosure;

FIGS. 6A and 6B are a flowchart illustrating steps in an operation of determining the text area illustrated in FIG. 5;

Figure 1:
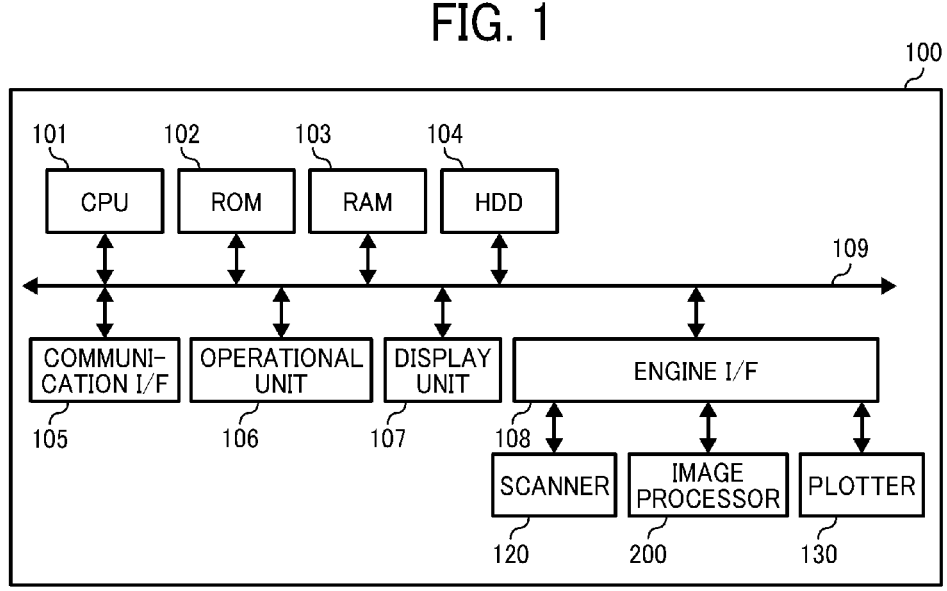
FIG. 1 is a block diagram illustrating a hardware configuration of a multifunction peripheral (MFP) as an example of an image processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

An embodiment of the present disclosure will be described hereinafter with reference to drawings.

FIG. 1 is a block diagram illustrating a hardware configuration of a multifunction peripheral (MFP) 100 as an example of an image processing apparatus according to an embodiment of the present disclosure.

The MFP 100 is an image processing apparatus that includes various functions such as a printer function, a scanner function, a facsimile function, a copier function, and a document storage function.

As illustrated in FIG. 1, the MFP 100 includes a central processing unit (CPU) 101, a read only memory (ROM) 102, a random access memory (RAM) 103, a hard disc drive (HDD) 104, a communication interface (I/F) 105, an operation unit 106, a display unit 107, and an engine interface 108. These hardware components are connected to one another via a system bus 109. Further, the MFP 100 includes a scanner 120, a plotter 130, and an image processor 200, which are connected to the engine interface 108.

The CPU 101 executes programs stored in the ROM 102 or the HDD 104 using the RAM 103 as a work area to control entire operation of the MFP 100 and implement various functions.

The ROM 102 and the HDD 104 are non-volatile storage media (storing units) and store various programs executed by the CPU 101 and various data described in detail later.

The communication interface 105 is an interface that enables the MFP 100 to communicate with other apparatuses. The communication interface 105 could be any interface that complies with the standard of a communication path to be used.

The operation unit 106 includes various keys, buttons, and/or a touch panel to accept user operation.

The display unit 107 includes a liquid crystal display (LCD) and/or an indicator lamp to display various type of information to a user such as an operational state or settings of the MFP 100 and messages.

It should be noted that the operation unit 106 and the display unit 107 may be external devices. Further, the MFP 100 does not necessarily accept user operations directly from a user. In other words, the MFP 100 may accept user operations from an external dedicated device that is connected to the MFP 100 via the communication interface 105. Further, the MFP 100 may display various information to the external device. In this case, the operation unit 106 and the display unit 107 are optional.

The engine interface 108 is an interface that connects the scanner 120, the plotter 130, and the image processor 200 to the system bus 109 to enable the CPU 101 to control the scanner 120, the plotter 130, and the image processor 200.

The scanner 120 is an image reading device that scans a document 121 (FIG. 2) and obtains its image data. The scanner 120 sends the image data to the image processor 200.

The image processor 200 determines a type of the document scanned by the scanner 120. Further, the image processor 200 selects a compression ratio corresponding to an image resolution suitable for the document depending on the type of the document. The image processor 200 compresses the image data with the selected compression ratio and outputs compressed image data. The image processor 200 in this disclosure could be more than one.

The plotter 130 forms an image on a sheet of paper in accordance with image data. Specifically, the plotter 130 is capable of forming an image 131 (FIG. 2) based on the compressed image data output by the image processor 200.

Figure 2:
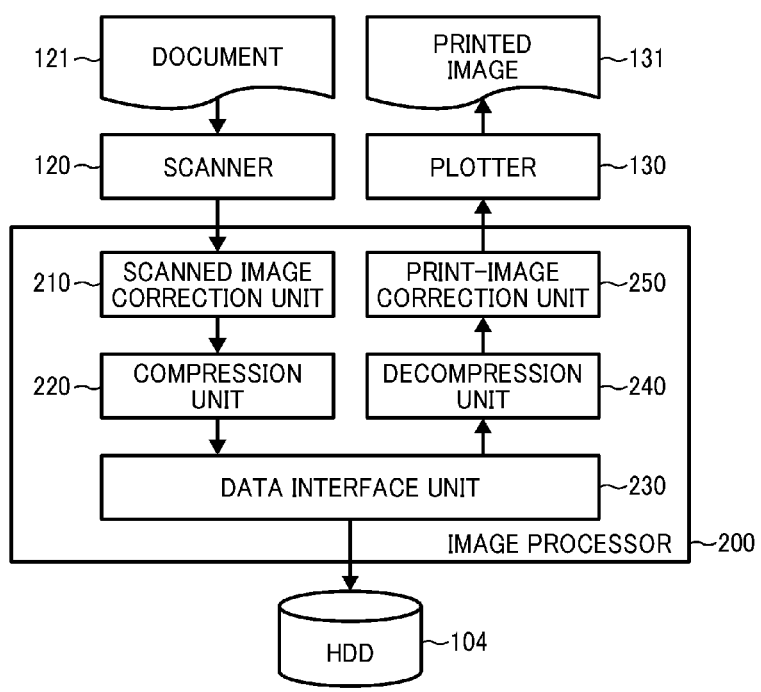
FIG. 2 is a block diagram illustrating a functional configuration of an image processor included in the MFP of FIG. 1.

FIG. 2 is block diagram illustrating a functional configuration of the image processor 200. Each of the functional blocks is implement by dedicated hardware, a processor that is caused to execute software, or a combination thereof. At least a part of functional blocks may be implemented by the CPU 101.

As shown in FIG. 2, the image processor 200 includes a scanned-image correction unit 210, a compression unit 220, a data interface unit 230, a decompression unit 240, and a print-image correction unit 250.

The scanned-image correction unit 210 classifies image data scanned by the scanner 120 and performs image processing on the image data. A detailed description is given later of functions of the scanned-image correction unit 210.

The compression unit 220 compresses the image data corrected by the scanned image correction unit 210 for internal processing.

The data interface unit 230 is an HDD management interface used when the image data compressed by the compression unit 220 are temporally stored in the HDD 104.

The decompression unit 240 decompresses the image data compressed for internal processing for use of image formation by the plotter.

The print-image correction unit 250 corrects the image data decompressed by the decompression unit 240 as needed, and sends the corrected image data to the plotter 130.

Figure 3:
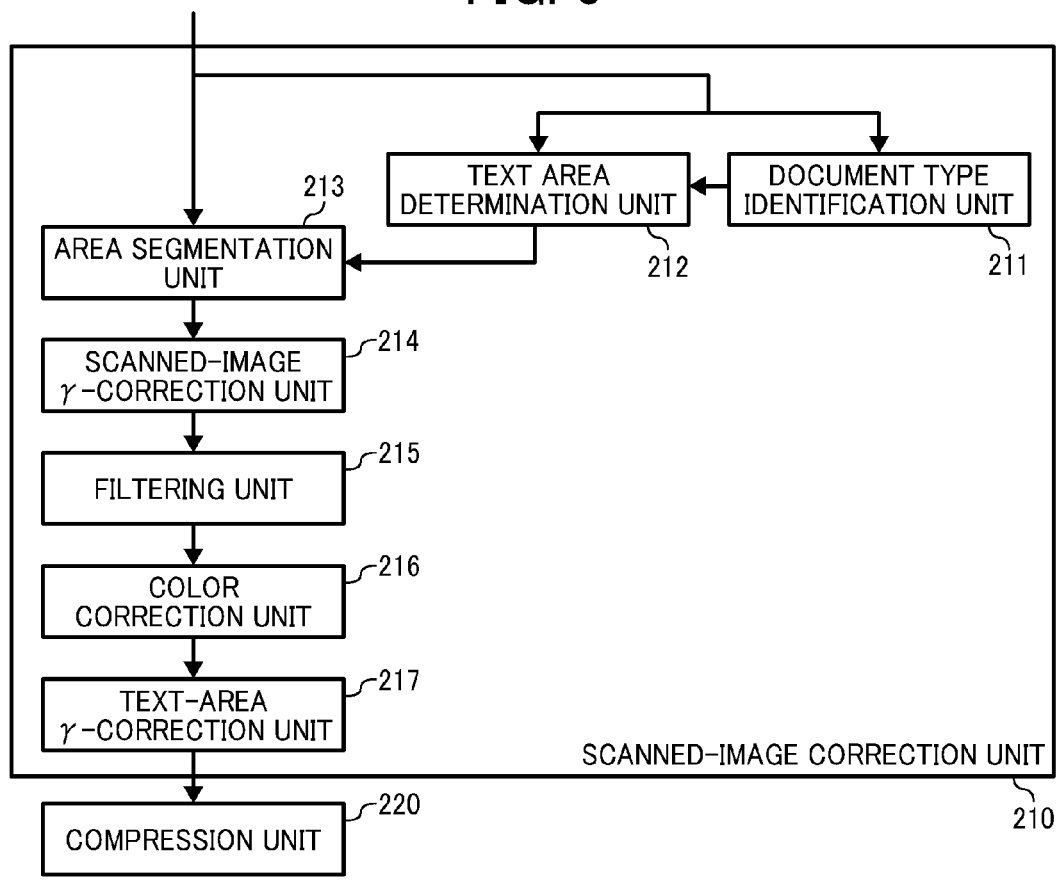
FIG. 3 is a block diagram illustrating a functional configuration of a scanned-image correction unit illustrated in FIG. 2.

FIG. 3 is a block diagram illustrating a functional configuration of the scanned-image correction unit 210 illustrated in FIG. 2.

As shown in FIG. 3, the scanned-image correction unit 210 includes a document type identification unit 211, a text area determination unit 212, an image area segmentation unit 213, a scanned-image gamma-correction unit 214, a filtering unit 215, a color correction unit 216, and a text-area gamma-correction unit 217.

The document type identification unit 211 determines whether image data as a processing target is image data of a document containing only text or image data of a colored document based on the features of a document containing text, a chromatic color document, a photograph on a photographic paper, and a photograph printed on a sheet or paper.

The text area determination unit 212 determines a text area that is present in an image represented by the image data based on features of the image. In other words, the text area determination unit 212 performs determination on image data that remains undetermined even after the determination by the document type identification unit 211 or performs re-determination to prevent erroneous determination.

The image area segmentation unit 213 separates the image data as a processing target into three types of areas, that is, a black text edge area, a color text edge area, and other areas, with reference to a determination result of the text area determined by the text area determination unit 212.

The scanned-image gamma-correction unit 214 converts the image data that is linear to reflectance into image data that is linear to image density.

The filtering unit 215 switches a filter to be applied to image data from among a plurality of filters. Specifically, the filtering unit 215 applies three different filters respectively to the three types of areas in the image data as a processing target that are separated by the image area segmentation unit 213.

The color correction unit 216 converts RGB image data to CMYK image data in areas other than the black text edge area.

The text-area gamma-correction unit 217 adjusts the gamma of the text area containing black text and color text to emphasize the text characters. The image data on which processing by the text-area gamma-correction unit 217 has been performed is supplied to the compression unit 220.

Figure 4:
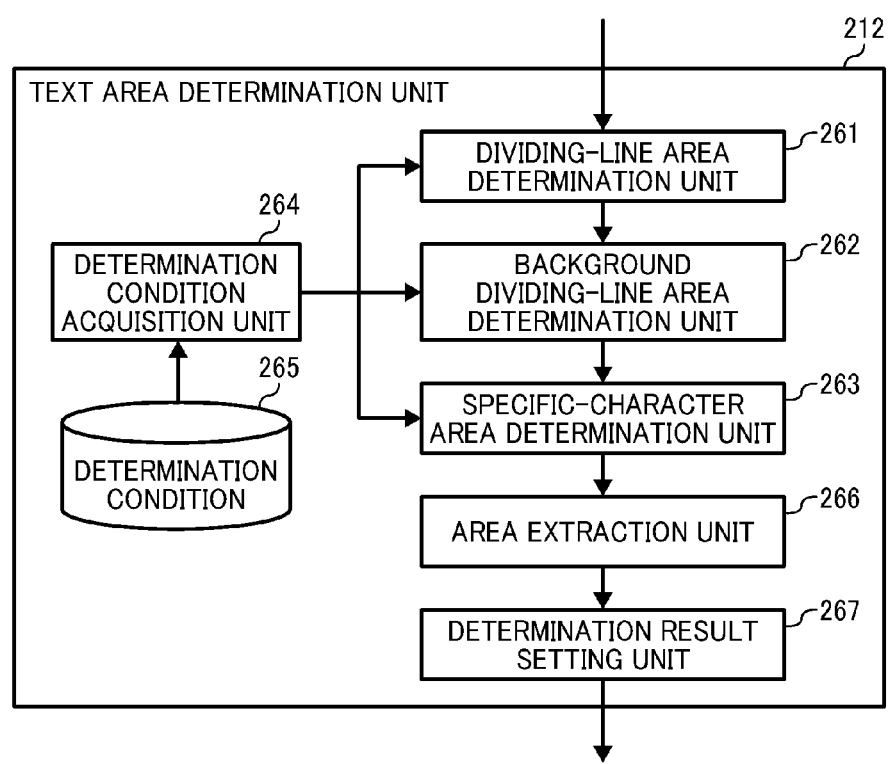
FIG. 4 is a block diagram illustrating a functional configuration of a text area determination unit illustrated in FIG. 3.

FIG. 4 is a block diagram illustrating a functional configuration of the text area determination unit 212 illustrated in FIG. 3.

The text area determination unit 212 includes a dividing-line area determination unit 261, a background dividing-line area determination unit 262, a specific-character area determination unit 263, a determination condition acquisition unit 264, determination conditions 265, an area extraction unit 266, and a determination result setting unit 267.

When determination conditions acquired by the determination condition acquisition unit 264 includes an item regarding a dividing line, the dividing-line area determination unit 261 sets an area based on a dividing line in the image data and sets an attribute of the area.

Specifically, the dividing-line area determination unit 261 extracts a vertical dividing line or lines and a horizontal dividing line or lines from document data or image data that is obtained by scanning a document printed on a sheet of paper. In addition, the dividing-line area determination unit 261 calculates, for each of the extracted dividing-lines, parameters to be compared with the determination conditions. Further, for each of the extracted dividing-lines, the dividing-line area determination unit 261 compares the parameters of the dividing line with the determination conditions. Furthermore, for each of the dividing-lines whose parameters match the determination conditions, the dividing-line area determination unit 261 sets an area and an attribute of the area based on the determination conditions. Examples of attributes that is set for each area include a text area and a picture area.

When the determination conditions acquired by the determination condition acquisition unit 264 includes an item regarding a background dividing-line, the background dividing-line area determination unit 262 sets an area based on a background dividing-line in the image data and sets an attribute of the area. In this disclosure, the background dividing-line means a background space that constitutes a virtual dividing line in place of an actual (visible) line.

Specifically, the background dividing-line area determination unit 262 extracts a background area or areas from document data or image data that is obtained by scanning a document image printed on a sheet of paper. In addition, the background dividing-line area determination unit 262 calculates, for each of the extracted background areas, parameters to be compared with the determination conditions. The background dividing-line area determination unit 262 may extract only an area or areas having a long and narrow shape as a potential background dividing-line. Further, for each of the extracted background areas, the background dividing-line area determination unit 262 compares the parameters of the background area with the determination conditions, and determines each of the background areas whose parameters match the determination conditions as a background dividing-line. Furthermore, for each of the background dividing-lines, the background dividing-line area determination unit 262 sets an area and an attribute of the area based on the determination conditions. A detailed description is given later of an operation of extracting the background area with reference to FIGS. 12A and 12B.

When the determination conditions acquired by the determination condition acquisition unit 264 includes an item regarding a specific character, the specific-character area determination unit 263 sets an area based on a specific character in the image data and sets an attribute of the area.

Specifically, the specific-character area determination unit 263 detects whether there is a specific character or characters that matches the determination conditions in document data or image data that is obtained by scanning a document image printed on a sheet of paper. Further, for each of the detected specific characters, the specific-character area determination unit 263 sets an area and an attribute of the area based on the determination conditions.

The determination condition acquisition unit 264 reads out and acquires information stored as the determination conditions 265.

The determination conditions 265 defines various conditions for determining various areas such as the text area based on features of a document (image data of the document) that is likely to be detected erroneously.

This determination is performed based on a feature element such as the dividing line, the background dividing-line, and the specific character. The areas such as the text area and the picture area are set with reference to the feature element. The determination conditions 265 is data defining conditions that the feature element has to satisfy, a position in the image data where the area is to be set with reference to the feature element that satisfies the conditions, and an attribute to be set for the area. A detailed description is given later of the determination conditions 265.

The area extraction unit 266 determines a range of the area of each attribute such as the text area and the picture area in the image data based on the result set by the dividing-line area determination unit 261, the background dividing-line area determination unit 262, and the specific-character area determination unit 263.

The determination result setting unit 267 sets, to the range that is determined as the text area in the image data, a compression ratio that is different from the compression ratio applied to other areas.

It should be noted that whether the dividing-line area determination unit 261, the background dividing-line area determination unit 262, and the specific-character area determination unit 263 actually performs the above-described determination process or not depends on for which type of the feature elements the determination conditions 265 includes the conditions.

The following tables 1 to 4 are examples of the determination conditions 265.

The determination conditions 265 include a category list of feature element as illustrated in Table 1. The determination conditions 265 further includes a detail table for each category as illustrated in Tables 2 to 4.

TABLE 1

| ID | Feature Element |
|----|-----------------|
| A  | Dividing line |
| B  | Specific character |
| C  | Background dividing-line |

TABLE 2

| | | Element conditions | | | | | |
|---|---|---|---|---|---|---|---|
| ID (A_) | Orientation | Color of line | Width | Color of range | Interval | Range | Determination Result |
| 001 | Vertical line | Black | 0.1 mm | Monochromatic | Don't care | Sandwiched portion | Text |

TABLE 2-continued

| ID (A_) | Element conditions | | | | | Range | Determination Result |
|---|---|---|---|---|---|---|---|
| | Orientation | Color of line | Width | Color of range | Interval | | |
| 002 | Horizontal line | Black | 0.1 mm | Containing Color | 30 mm | Sandwiched portion | Text |
| 003 | Horizontal line | Black | 0.1 mm | Monochromatic | 50 mm | Sandwiched portion | Text |
| ... | ... | ... | ... | ... | ... | ... | ... |

TABLE 3

| ID (B_) | Element conditions | | | | | Range | Determination Result |
|---|---|---|---|---|---|---|---|
| | Symbol | Color of range | Combination | Symbol inclusive? | Direction | | |
| 001 | "Å" | Monochromatic | A_001 | Inclusive | Horizontal | To next dividing line | Text |
| 002 | "▼" | Monochromatic | A_001 | Inclusive | Horizontal | To next dividing line | Text |
| 003 | "Δ" | Monochromatic | A_001 | Inclusive | Horizontal | To next dividing line | Text |
| ... | ... | ... | ... | ... | ... | ... | ... |

TABLE 4

| ID (C_) | Element conditions | | | | Range | Determination Result |
|---|---|---|---|---|---|---|
| | Orientation | Width | Color of range | Interval | | |
| 001 | Vertical line | 10 mm | Containing color | Don't care | Sandwiched portion | Text |
| 002 | Horizontal line | 5 mm | Monochromatic | 30 mm | Sandwiched portion | Text |
| 003 | Horizontal line | 10 mm | Monochromatic | 50 mm | Sandwiched portion | Text |
| ... | ... | ... | ... | ... | ... | ... |

In each of Tables 1 to 4, priority among items in the table may be designated. For example, when the determination regarding a background dividing-line is to be performed prior to the determination regarding a dividing line, the feature elements in Table 1 may be arranged in the desired execution order. This enables performing the determination process regarding each feature element in the desired order. The same applies to each of the determination conditions of Tables 2 to 4. In each of Table 1 to Table 4, an ID (identification) is a sequential number indicating a priority level.

Table 1 associates a category ID of the feature element with a type of the feature element. Although Table 1 stores the dividing line, the specific character, and the background dividing-line as the type of feature element, any other suitable type of feature element may be used. In this case, the text area determination unit 212 includes an additional determination unit corresponding to the type of feature element.

Table 1 to Table 4 stores details of the determination conditions regarding the feature element of each category defined in Table 1. The number of those detail tables corresponds to the number of categories defined in Table 1. In this embodiment, Tables 2 to 4 are provided respectively for the three categories defined in Table 1.

In each of Tables 2 to 4, data of one row indicates contents of one determination condition. Each of the determination conditions includes information of the ID, element conditions, a range, and a determination result.

From among those information items, the "element conditions" define conditions that the feature element has to satisfy or conditions that a relation between the feature element and another element has to satisfy. The number and content of the element conditions vary depending on the category of feature elements.

The "range" indicates a position or a space where an area is to be set with reference to the feature element. The "determination result" indicates an attribute to be assigned to the set area. Although the determination result includes only "text" (text area) in examples of Table 2 to Table 4, any other suitable attribute may be set.

Table 2 is a table of the determination conditions regarding a dividing line, which is the feature element associated with ID=A in Table 1. With respect to the dividing line, the element conditions include an orientation, a color of line, a width, a color of range, and an interval.

The "orientation" indicates a condition for an orientation of dividing line. Any one of a vertical line, a horizontal line or a "Don't care" (any orientation) is specified. The "color of line" indicates a condition for a color of a dividing line.

Although "black" is designated as the color of line in an example of Table 2, color information such as a ratio or an amount of RGB may be specified. The "width" indicates a condition for a width of dividing line. Although the width is represented in unit of millimeters in an example of Table 2, the width may be in any suitable units such as inches and pixels. The width of dividing line may not be exactly same as the value specified in Table 2. A dividing line having the same or substantially the same width as the value in Table 2 is determined as a dividing line satisfying the condition.

The "color of range" defines whether a feature element (dividing line) as a processing target is determined as a feature element satisfying the element condition when the area that is set with reference to the feature element based on the condition of the "range" is monochromatic or when the area contains color. The "interval" indicates an interval between dividing lines. The interval is a condition for an interval between a target dividing line and an extracted neighboring line. Those "color of range" and "interval" are not conditions regarding characteristics of the feature element itself.

For example, with respect to the determination condition of ID=A_001, a certain dividing line is determined as satisfying the element conditions when the certain dividing line is a black vertical line having a width of 0.1 mm, and a portion sandwiched between the certain dividing line and the neighboring line (based on the condition of the "range") is monochromatic, regardless of an interval between the certain dividing line and the neighboring line. In this case, the portion sandwiched between the dividing line satisfying the element conditions and the neighboring line is set to an area, and an attribute of the area is set to text according to Table 2. It should be noted that the neighboring line also has to satisfy the element conditions associated with the same ID.

Table 3 is a table of the determination conditions regarding a specific character, which is the feature element associated with ID=B in Table 1. With respect to the specific character, the element conditions include a symbol, a color of range, a combination, a symbol inclusive or not, and a direction.

The "symbol" indicates a specific character or a character string used in the determination. The symbol is indicated by image data, a character code, a font, and/or a size (width and height), for example. The "color of range" is the same or substantially the same as that of Table 2. In a case in which the "range" is defined relative to a feature element that satisfies the element conditions associated with an ID different from a target ID, the "combination" designates the different ID. The ID designated by the "combination" could be more than one.

The "symbol inclusive or not" indicates whether the "range" is set to include the specific character itself. The "direction" indicates a direction of a character string used in the determination. Either vertical or horizontal is designated.

From among those element conditions, the element conditions other than the "symbol" and "direction" are not conditions regarding characteristics of the feature element itself.

For example, with respect to the determination condition of ID=B_001, a certain specific character "A" is determined satisfying the element conditions when the certain specific character "A" is arranged horizontally, and a region (based on the condition of the "range") from the specific character (inclusive) to a next dividing line satisfying the element conditions associated with the ID=A_001 along a direction in which the character string is arranged is monochromatic.

In this case, the region between the specific character "A" and the next dividing line satisfying the element conditions associated with the ID=A_001 is set to an area, and an attribute of the area is set to text according to Table 2.

Table 4 is a table of the determination conditions regarding a background dividing-line, which is the feature element associated with ID=C in Table 1. With respect to the background dividing-line, the element conditions include an orientation, a width, a color of range, and an interval. The determination conditions regarding the background dividing-line are the same or substantially the same as those of the determination conditions regarding the dividing line of Table 2 except for not including "color" as the element condition.

Hereinafter, a description is given of steps in an operation of image processing including setting the area and the attribute according to the determination conditions described heretofore with reference to flowcharts.

FIG. 5 is a flowchart illustrating steps in an overall operation of the image processing.

The image processor 200 starts the operation illustrated in the flowchart of FIG. 5 in response to acquiring image data from the scanner 120. This process of acquiring the image data corresponds to a step of inputting image data. Further, this process of acquiring the image data corresponds to circuitry to input image data.

First, the text area determination unit 212 of the scanned-image correction unit 210 distinguishes a text area from other areas in the image data (S11). A detailed description is given later of determining the text area at S11 with reference to a flowchart of FIGS. 6A, 6B and 7. At S12, the image area segmentation unit 213, the scanned-image gamma-correction unit 214, the filtering unit 215, the color correction unit 216, and the text-area gamma-correction unit 217 successively performs image processing for a scanned image on the image data acquired from the scanner 120.

At S13, the compression unit 220 compresses the image data acquired from the scanner 120. More specifically, the compression unit 220 performs compression on the text area and other areas (picture area) respectively with different suitable processes based on the determination result obtained at S11 by the text area determination unit 212. At S14, the image processor 200 stores the compressed image data in the HDD 104 via the data interface unit 230.

At S15, the decompression unit 240 decompresses the image data stored at S14 before the output by the plotter 130. At S16, the printing-image correction unit 250 performs image processing on the decompressed image data in accordance with characteristics of the plotter 130. Further, at S16, the printing-image correction unit 250 performs image processing such that characters in the text area are emphasized based on the determination result at S11. The printing-image correction unit 250 outputs the image data on which the image processing has been performed, and the operation of FIG. 5 ends.

The image processing at S16 on characters in the text area is performed in order to prevent the edge of character from becoming light due to processing from S12 to S15 or to enhance legibility of characters that deteriorates due to show-through that occurs when a document having a high-level background is scanned.

Figure 6B:
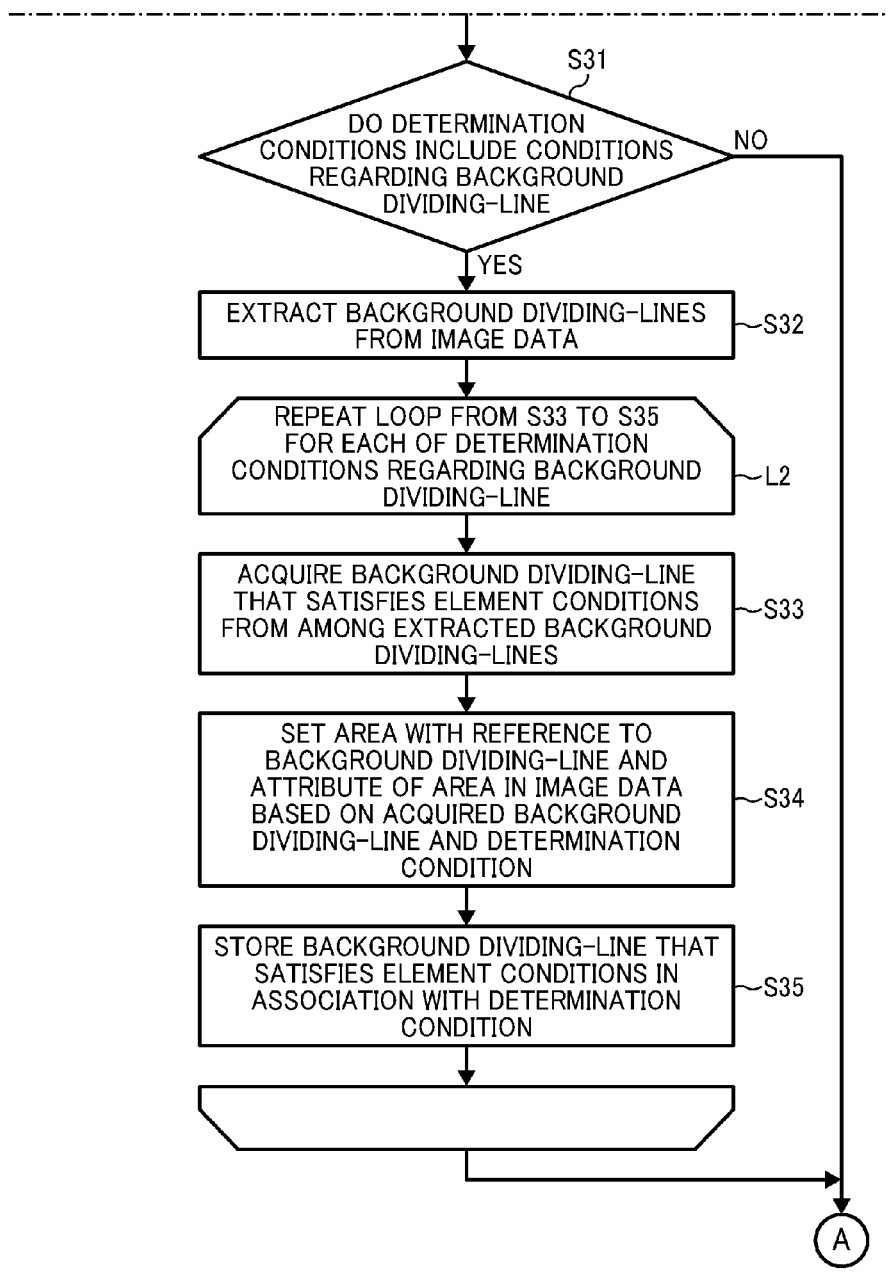

FIGS. 6A and 6B are a flowchart illustrating detailed steps in the operation of determining the text area at S11 of FIG. 5. The operation illustrated in this flowchart corresponds to the function of the text area determination unit 212 illustrated in FIG. 4.

First, at S21, the text area determination unit 212 refers to the category list (Table 1) from among the determination conditions 265 acquired by the determination condition acquisition unit 264 to determine whether the determination conditions 265 includes the condition regarding a dividing line. When the determination conditions 265 includes the condition regarding a dividing-line (S21: YES), the dividing-line area determination unit 261 extracts all dividing lines contained in the image data (S22). Further, at L1, the dividing-line area determination unit 261 performs processes from S23 to S25 one determination condition regarding a dividing line (see Table 2) at a time until the processes are performed on all of the determination conditions regarding a dividing line.

More specifically, at S23, the dividing-line area determination unit 261 obtains, from among the dividing lines extracted at S22, a dividing line(s) that satisfies the element conditions in the determination condition as a current processing target. The dividing-line area determination unit 261 retains information regarding a dividing line(s) that is not obtained at S23.

At S24, the dividing-line area determination unit 261 sets an area with reference to a dividing line and an attribute of the area based on the dividing line acquired at S23 and the determination condition as the current processing target. For example, when the current processing target is the determination condition of ID=A_001, the dividing-line area determination unit 261 sets an area to a portion sandwiched between the dividing lines satisfying the element conditions associated with ID=A_001. In addition, the dividing-line area determination unit 261 sets an attribute of that area to text. At S25, the dividing-line area determination unit 261 stores the dividing line or lines that satisfy the element conditions in association with the determination condition as the current processing target. The information stored at S25 is referenced in processing on the other feature elements such as a specific character.

After the loop L1 from S22 to S25, or when the determination result at S21 is NO, the operation proceeds to S31. At S31, the text area determination unit 212 determines whether the determination conditions 265 acquired by the determination condition acquisition unit 264 includes the condition regarding a background dividing-line. It should be noted that although Table 1 indicates that the determination regarding a specific character is to be performed prior to the determination regarding a background dividing-line, in an example of FIGS. 6A and 6B, the determination regarding a background dividing-line is performed prior to the determination regarding a specific character.

When the determination conditions 265 includes the condition regarding a background dividing-line (S31: YES), the background dividing-line area determination unit 262 extracts all background dividing-lines contained in the image data (S32). Further, at L2, the background dividing-line area determination unit 262 performs processes from S33 to S35 one determination condition regarding a dividing line (see Table 4) at a time until the processes are performed on all of the determination conditions regarding a dividing line.

More specifically, at S33, the background dividing-line area determination unit 262 obtains, from among the background dividing-lines extracted at S32, a background dividing-line(s) that satisfies the element conditions in the determination condition as a current processing target. The background dividing-line area determination unit 262 retains information regarding a background dividing-line(s) that is not obtained at S33.

At S34, the background dividing-line area determination unit 262 sets an area with reference to a background dividing-line and an attribute of the area based on the background dividing-line acquired at S33 and the determination condition as the current processing target. For example, when the current processing target is the determination condition of ID=C_001, the background dividing-line area determination unit 262 sets a portion sandwiched between the background dividing-lines satisfying the element conditions associated with ID=C_001 to an area. Further, the background dividing-line area determination unit 262 sets an attribute of that area to text. At 35, the background dividing-line area determination unit 262 stores the background dividing-line or lines that satisfy the element conditions in association with the determination condition as the current processing target. The information stored at S35 is referenced in processing on the other feature elements such as a specific character.

Figure 7:
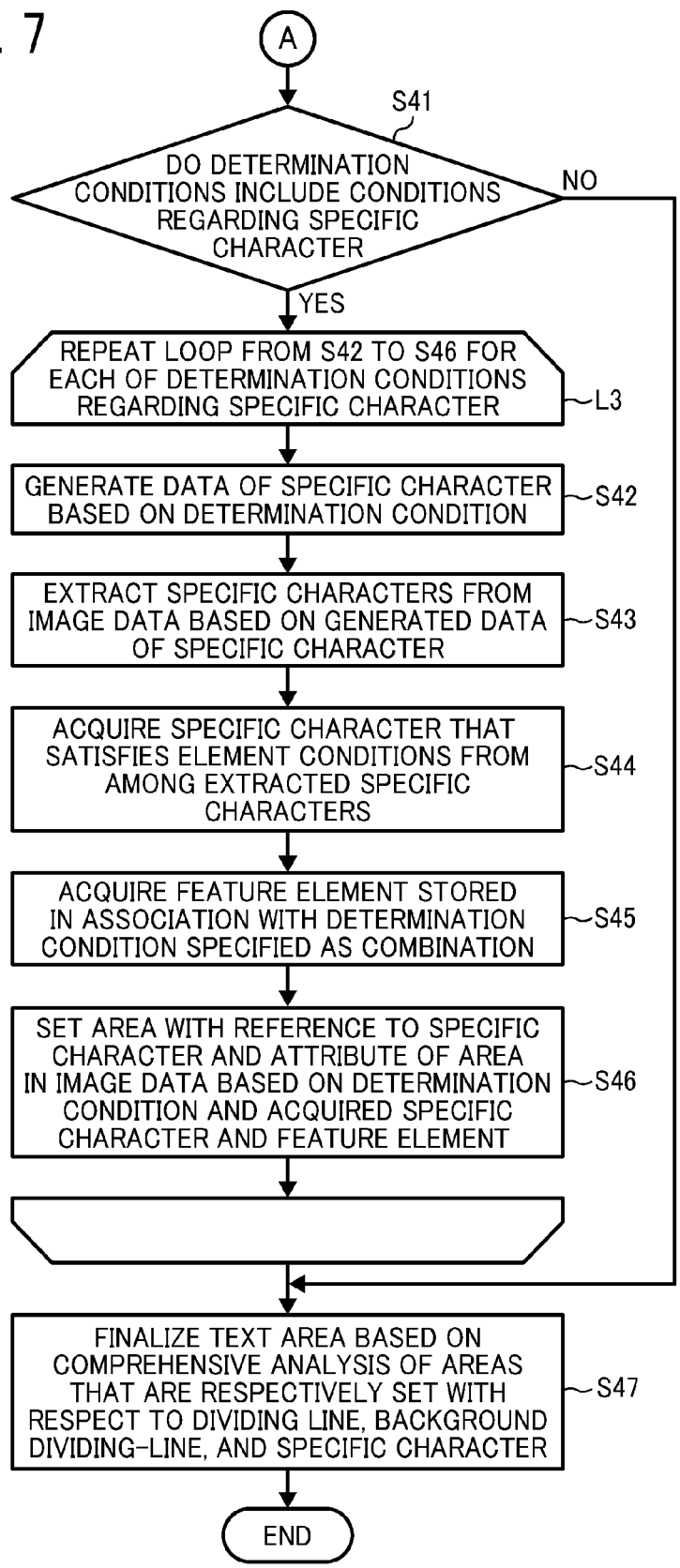
FIG. 7 is a flowchart illustrating subsequent steps in the operation illustrated in FIG. 6B.

After the loop L2 from S32 to S35, or when the determination result at S31 is NO, the operation proceeds to S41 of FIG. 7. At S41, the text area determination unit 212 determines whether the determination conditions 265 acquired by the determination condition acquisition unit 264 includes the condition regarding a specific character.

When the determination conditions 265 includes the condition regarding a specific character (S41: YES), the specific-character area determination unit 263 performs processes from S42 to S46 (L3) one determination condition regarding a specific character (see Table 3) at a time until the processes are performed on all of the determination conditions regarding a specific character. Different from the dividing line or the background dividing-line, the condition for extracting a specific character is included in the determination conditions. This is the reason an extraction of specific character is performed in the processing loop L3.

In the processing loop L3, at S42, the specific-character area determination unit 263 generates data of a specific character to be detected based on the designations of the "symbol" and the "direction" from among the determination condition as a current processing target. At S43, the specific-character area determination unit 263 extracts, from the image data as a processing target, all specific characters that match the generated data of specific character.

At S44, the specific-character area determination unit 263 obtains, from among the specific characters extracted at 43, a specific character(s) that satisfies the element conditions in the determination condition as the current processing target. The specific-character area determination unit 263 retains information regarding a specific character(s) that is not obtained at S44. At S45, the specific-character area determination unit 263 acquires the feature element that is stored in association with the determination condition designated as the "combination" in the determination condition as the current processing target. More specifically, the specific-character area determination unit 263 acquires the dividing line or lines stored at S25 and the background dividing-line or lines stored at S35.

At S46, the specific-character area determination unit 263 sets an area with reference to a specific character and an attribute of the area based on the specific character acquired at S44, the feature element(s) acquired at S45, and the determination condition as the current processing target. For example, when the current processing target is the determination condition of ID=B_001, the specific-character area determination unit 263 sets a region from the specific character satisfying the element conditions and a next dividing line satisfying the element conditions associated with ID=A_001 along a direction in which the character string is arranged. Further, the specific-character area determination unit 263 sets an attribute of that area to text.

After the loop L3 from S42 to S46, or when the determination result at S41 is NO, the operation proceeds to S47. At S47, the area extraction unit 266 consolidates those three types of area that are respectively set with reference to a dividing line, a background dividing-line, and a specific character to determine an area whose attribute is text in the image data. Although a description has been given of an example in which the area having the attribute of text is determined, an area having any other suitable attribute such as a picture area may be determined.

After S47, the operation ends. It should be noted that a detailed description is given later of the process of S47 with reference to FIG. 13.

In the operation of FIGS. 6A, 6B and 7 as described heretofore, processes at S22, S23, and S43 correspond to a process of a step of extracting and a function of circuitry to extract a feature element. Further, processes at S24, S34, S46 and S47 correspond to a process of a step of setting an attribute and a function of circuitry to set an attribute.

The text area determination unit 212 in this embodiment performs the extraction of feature element and the setting of attribute by the circuitry for each of a plurality of types of feature elements, while selecting a type of feature element as a processing target in a predetermined order as described heretofore.

Hereinafter, a description is given of several examples in which the operation of FIGS. 6A, 6B and 7 is applied to specific image data.

Figure 8A:
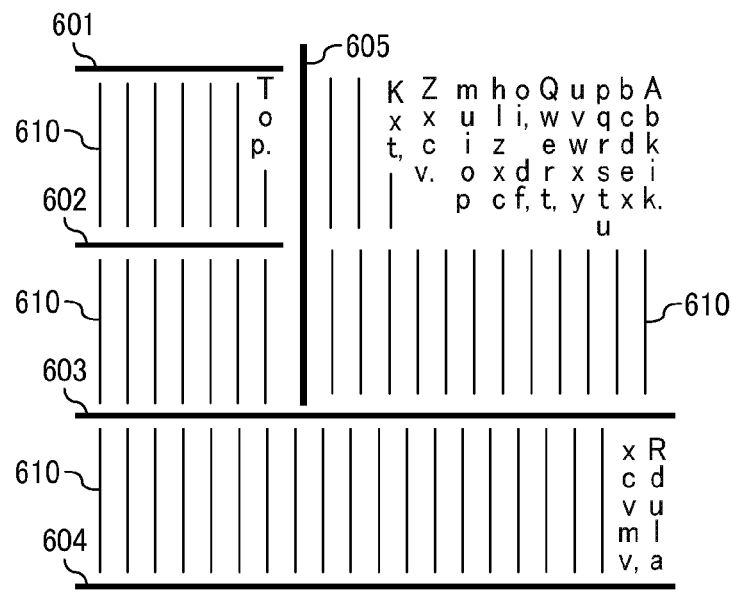
FIGS. 8A to 8C are illustrations for describing an example in which a process of setting an area with reference to a dividing line is applied to image data obtained by scanning an image formed on a sheet of paper according to an embodiment of the present disclosure.
Figure 8B:
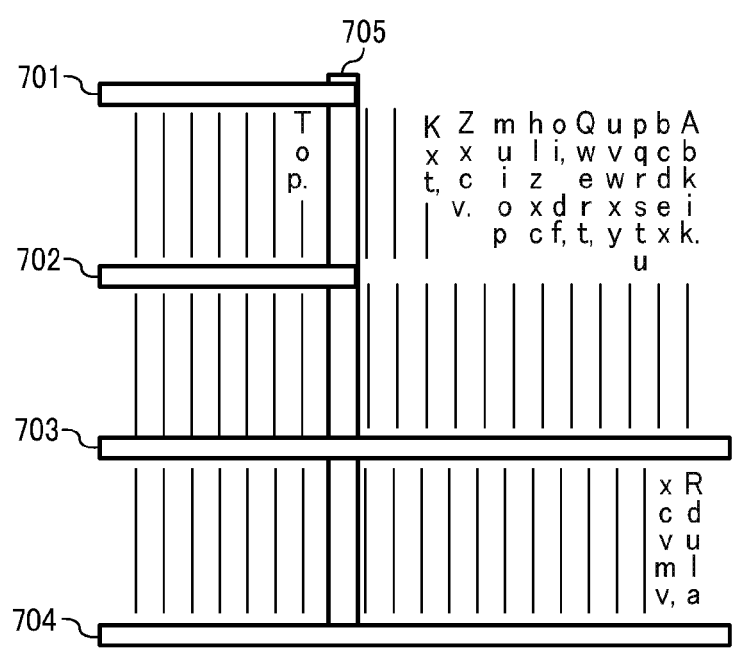
Figure 8C:
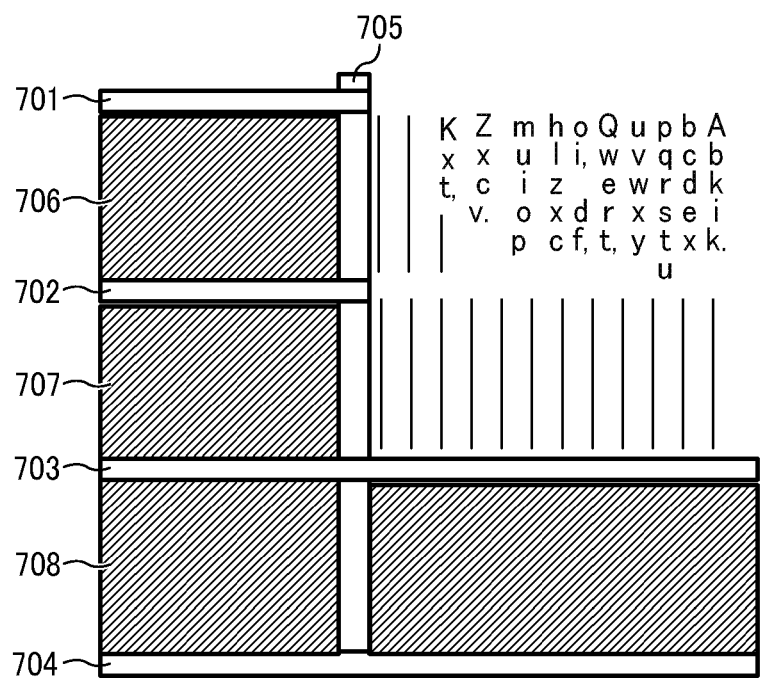

FIGS. 8A to 8C are illustrations for describing an example in which the processes from S22 to S25 of setting an area with reference to a dividing line are applied to image data that is obtained by scanning an image on a sheet of paper.

FIG. 8A is a schematic view illustrating the image data in the initial state. In FIG. 8A, each of bold lines 601 to 605 indicates a dividing line. Further, in FIG. 8A, characters are indicated by narrow lines 610, in order to simplify the drawing.

FIG. 8B is a view illustrating the image data in which dividing lines satisfying the element conditions are extracted from among the bold lines 601 to 605. When it is assumed that an interval of one column is 30 mm and a thickness of each dividing line is 0.1 mm, dividing lines 701 to 703 are each extracted as a dividing line satisfying the element conditions by the processes of S22 and S23 in FIG. 6A when a processing target is ID=A_002.

FIG. 8C is a view illustrating the image data in which areas are set with reference to the extracted dividing lines. More specifically, areas 706 to 708 are set as illustrated in FIG. 8C, because a portion sandwiched between the extracted dividing lines is set to an area by the process of S24 in FIG. 6A.

It should be noted that a dividing line 705 is also illustrated in FIG. 8, which is extracted when a processing target is ID=A_001 in Table 2. Because only the dividing line 705 is extracted as a dividing line satisfying the element conditions associated with ID=A_001, there is no area sandwiched between dividing lines. Accordingly, no area is set when the processing target is ID=A_001.

Figure 9A:
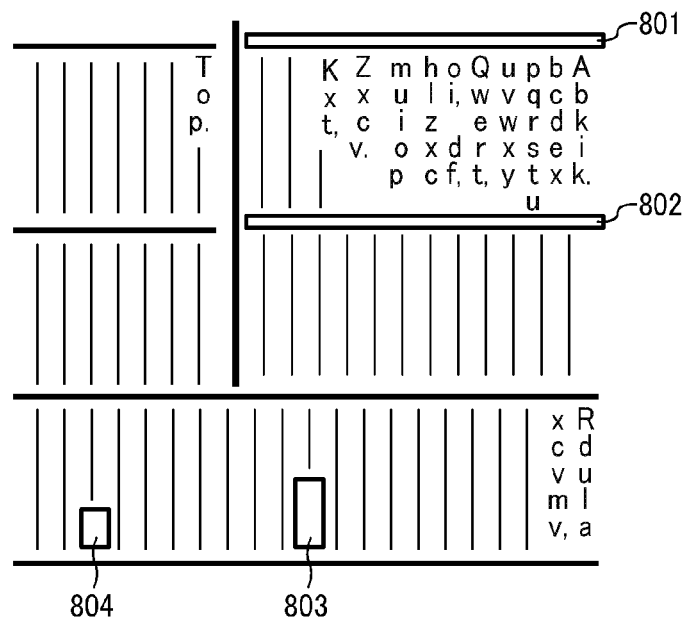
FIGS. 9A and 9B are illustrations for describing an example in which a process of setting an area with reference to a background dividing-line is applied the same image data as that of FIG. 8A.
Figure 9B:
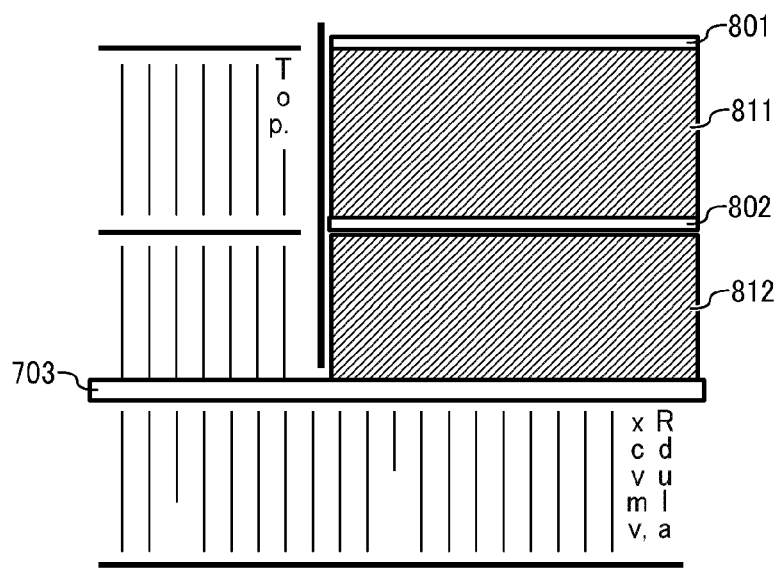

FIGS. 9A and 9B are illustrations for describing an example in which the processes from S32 to S35 of setting an area with reference to a background dividing-line are applied to the same image data as that illustrated in FIG. 8A.

More specifically, FIG. 9A is a view illustrating the image data in which background areas satisfying the element conditions are extracted. As illustrated in FIG. 9A, areas 801 to 804 are each extracted as a background area in the image data. Because only the background areas 801 and 802 satisfy the element conditions associated with ID=C_002 in Table 4, for example, each of the background areas 801 and 802 is extracted as a background dividing-line.

FIG. 9B is a view illustrating the image data in which areas are set with reference to the extracted background dividing-lines. More specifically, an area 811 is set as illustrated in FIG. 9B, because a portion sandwiched between the extracted background dividing-lines is set to an area by the process of S34. It should be noted that an area 812 is not sandwiched between the background dividing lines 801 and 802. However, when A_002 is designated as the "combination" in the element conditions, a portion sandwiched between the dividing line 703 and the background dividing lines 802 to an area 812. Alternatively, when "a portion that contacts a background dividing-line" is assigned to the "range" in the element conditions, the area 812 is set in the similar way as above.

Figure 10:
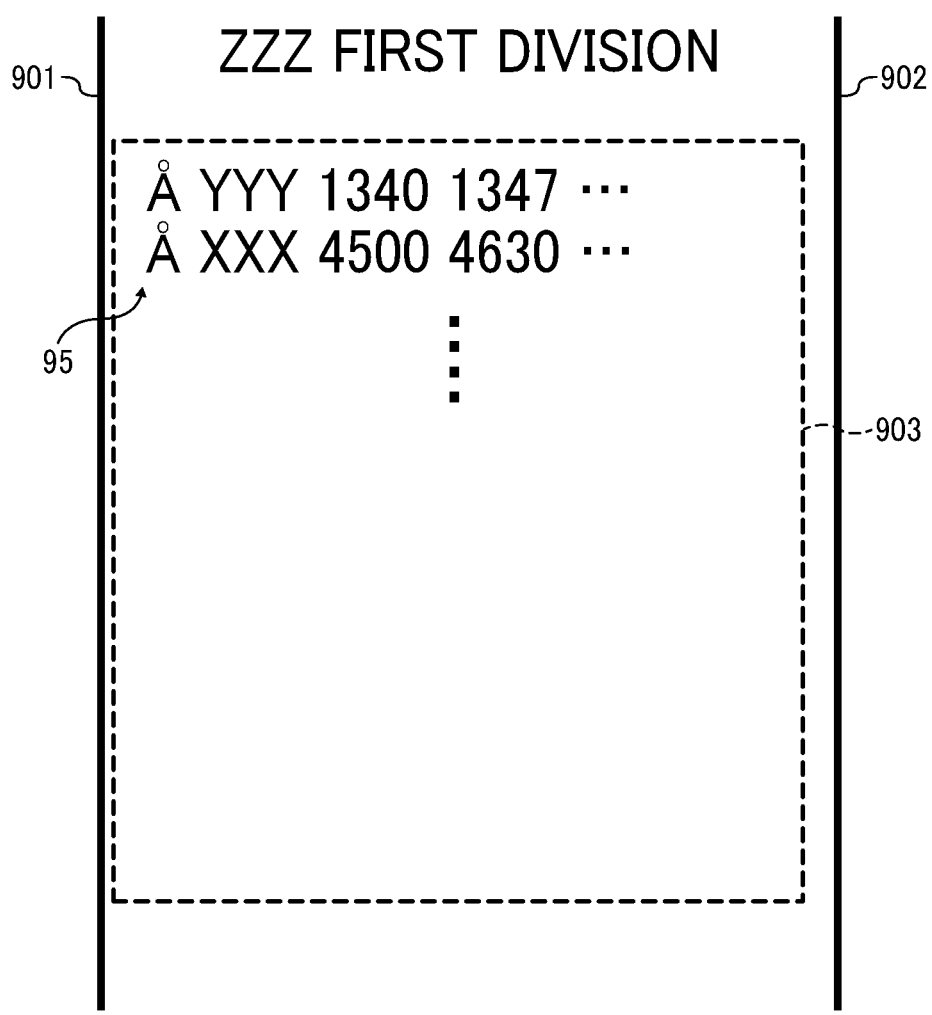
FIG. 10 is an illustration for describing a process of setting an area with reference to a specific character according to an embodiment of the present disclosure.

FIG. 10 is an illustration for describing an example in which the processes from S42 to S45 in FIG. 7 of setting an area with reference to a specific character are performed on image data. With reference to FIG. 10, a description is given of an example in which the processes are performed on the determination condition of ID=B_001 in Table 3.

Because the dividing line of A_001 is designated as the "combination" in this determination condition, an area is set using dividing lines 901 and 902 each satisfying the element conditions associated with A_001.

The specific-character area determination unit 263 generates image data of a specific character based on "Å" of the "symbol" and "horizontal" of the "direction" in the element conditions. Further, the specific-character area determination unit 263 determines whether image data contains a portion that matches the generated image data of specific character. The specific-character area determination unit 263 detects a character "Å" 95 as illustrated in FIG. 10. Based on the detection, the specific-character area determination unit 263 sets a region sandwiched between a position of the character "Å" and the next dividing line 902 to an area 903.

It may take a long time to detect a portion that matches the image data of specific character from the entire image data. To address this issue, a position and the like of the specific character relative to a dividing line designated by the "combination" may be defined in advance, and the detection of a portion that matches the image data of specific character may be performed on only the position defined in advance.

Hereinafter, with reference to FIGS. 11A and 11B, a description is given of an operation of extracting a background diving-line using the determination condition regarding a dividing line when a document includes a background dividing line but the determination conditions 265 does not include the condition regarding a background dividing-line. This operation is a modified example of the process of extracting the background dividing-line in an operation of FIGS. 6A, 6B and 7.

Figure 11A:
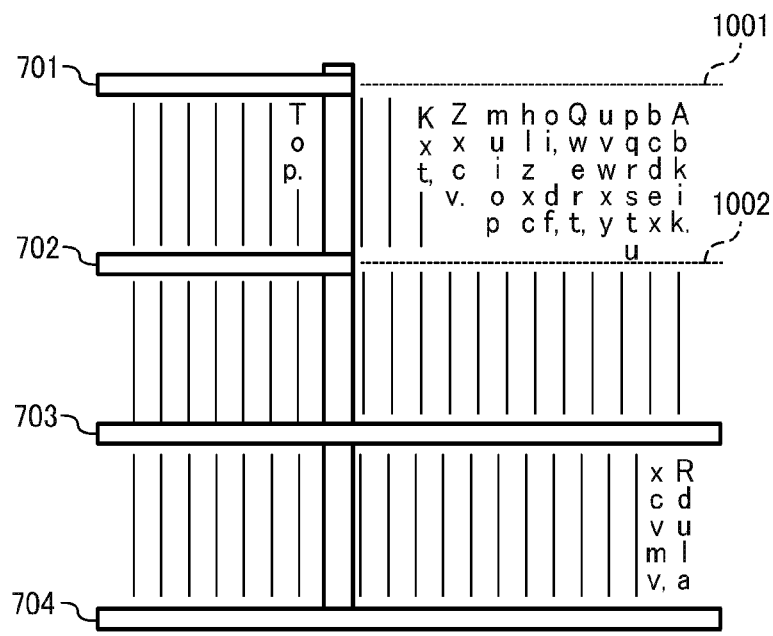
FIGS. 11A and 11B are illustrations for describing an operation of extracting a background dividing-line using determination conditions regarding a dividing-line according to an embodiment of the present disclosure.

FIG. 11A, the dividing lines 701 to 704 are the same as those of FIG. 8B. As illustrated in FIG. 11A, a background diving-line is likely to exist on a line extending over a dividing-line that terminates at some point in the image, such as the dividing lines 701 or 702. Accordingly, detection of background is performed on extensions 1001 and 1002 to detect background areas. The determination conditions regarding a dividing-line are applied to the detected background areas to extract background dividing-line areas based on which a text area or other areas are set.

Figure 11B:
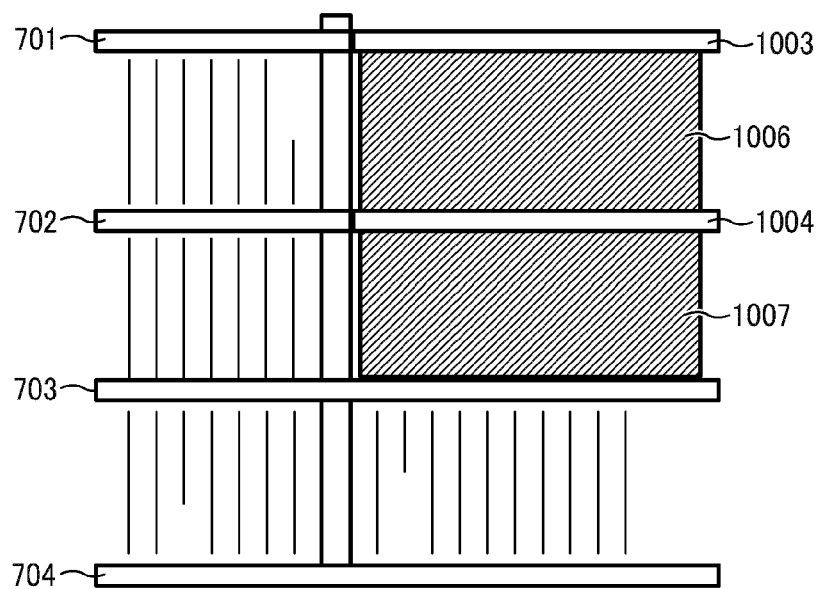

In this example, as illustrated in FIG. 11B, dividing lines 1003 and 1004 are extracted on the extensions 1001 and 1002. Accordingly, areas 1006 and 1007 are set, each being an area sandwiched between the dividing lines, in accordance with the determination conditions regarding a dividing line.

Figure 12A:
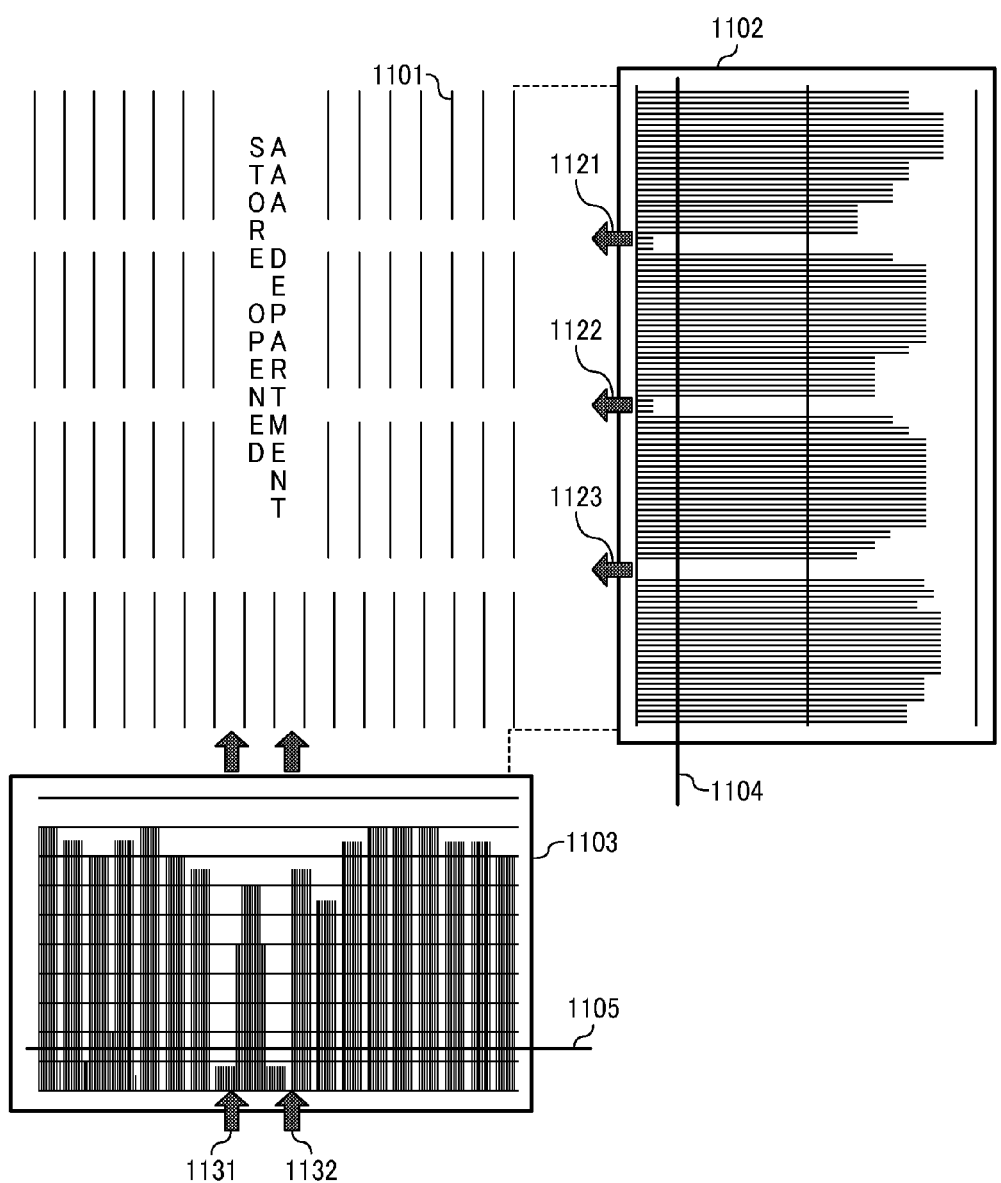
FIGS. 12A and 12B are illustrations for describing an operation for extracting a candidate for a background dividing-line from a result of background extraction according to an embodiment of the present disclosure.
Figure 12B:
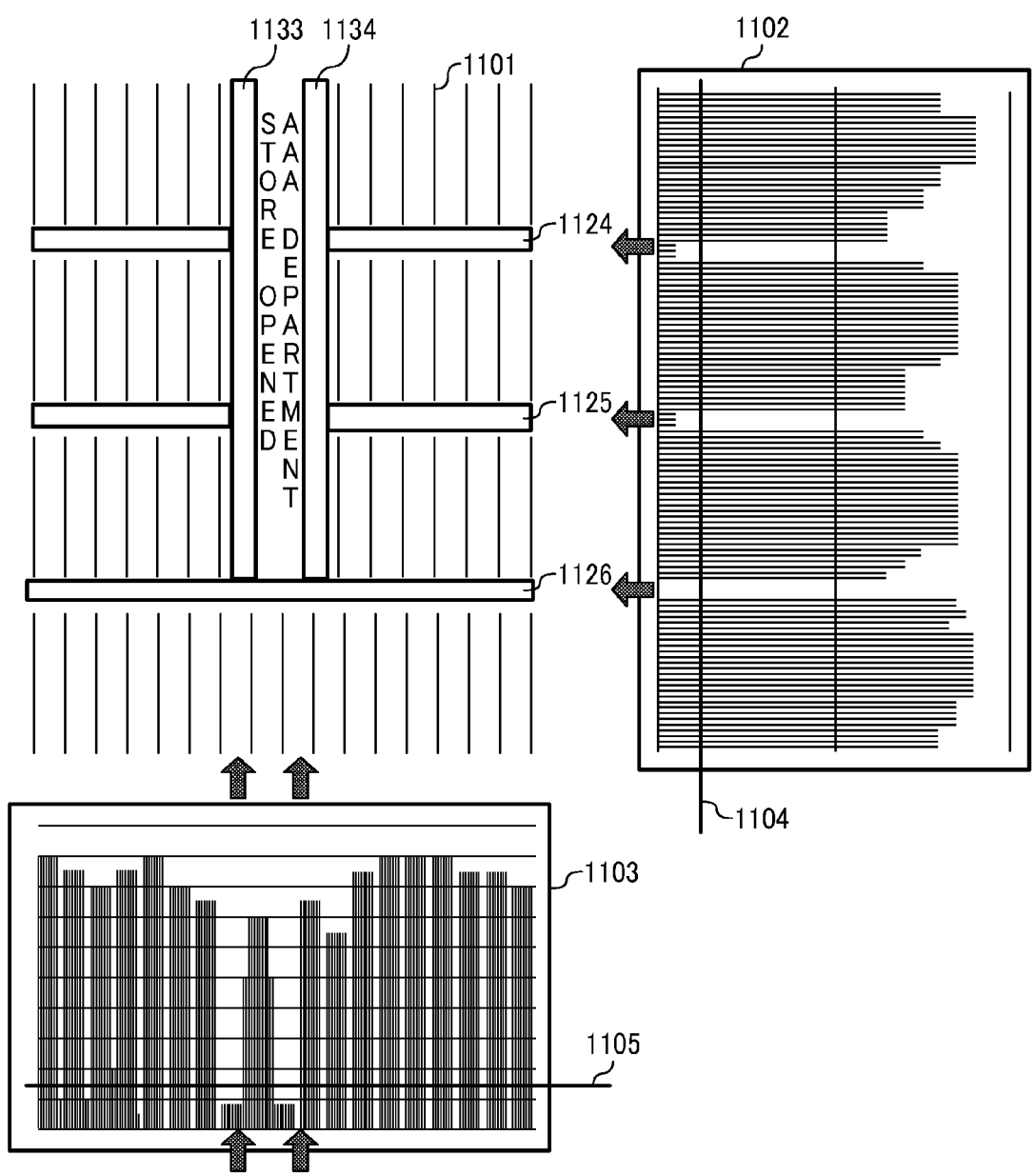

Hereinafter, a description is given of extracting a candidate for a background dividing-line based on a result of background area extraction with reference to FIGS. 12A and 12B.

It should be noted that whether characters are written vertically or horizontally in the image data is determined using any suitable technique known in the art. After the determination as to whether characters are horizontally written or vertically written, the background dividing-line area determination unit 262 obtains histograms 1102 and 1103, which respectively represent vertical and horizontal black portions in image data 1101, as illustrated in FIG. 12A. Because the image data 1101 represents a document in which characters are written in a vertical direction, spaces between lines in the histogram 1103 are obtained. However, the background dividing-line area determination unit 262 does not determine spaces between lines as a candidate for a background dividing-line. The background dividing-line area determination unit 262 extracts background portions in the image data 1101, which respectively correspond to portions 1131 and 1132 in the histogram 1103, each having a low histogram value and a width greater than a line space. Accordingly, as illustrated in FIG. 12B, the background dividing-line area determination unit 262 extracts areas 1131 and 1134 each being constituted by a continuous background as a candidate for a background dividing-line.

Further, the background dividing-line area determination unit 262 extracts background portions in the image data 1101, which respectively correspond to portions 1121, 1122 and 1123 each having a low value in the histogram 1102. Accordingly, the background dividing-line area determination unit 262 extracts areas 1124, 1125, and 1126 each being constituted by a continuous background as a candidate for a background dividing-line.

Thresholds 1104 and 1105 based on which a histogram value is low or not is determined are set in advance in a system.

Hereinafter, a description is given of an operation of consolidating the setting result of areas based on the plurality of feature elements to determine a text area, with reference to FIG. 13. This operation corresponds to S47 of FIG. 7.

Figure 13:
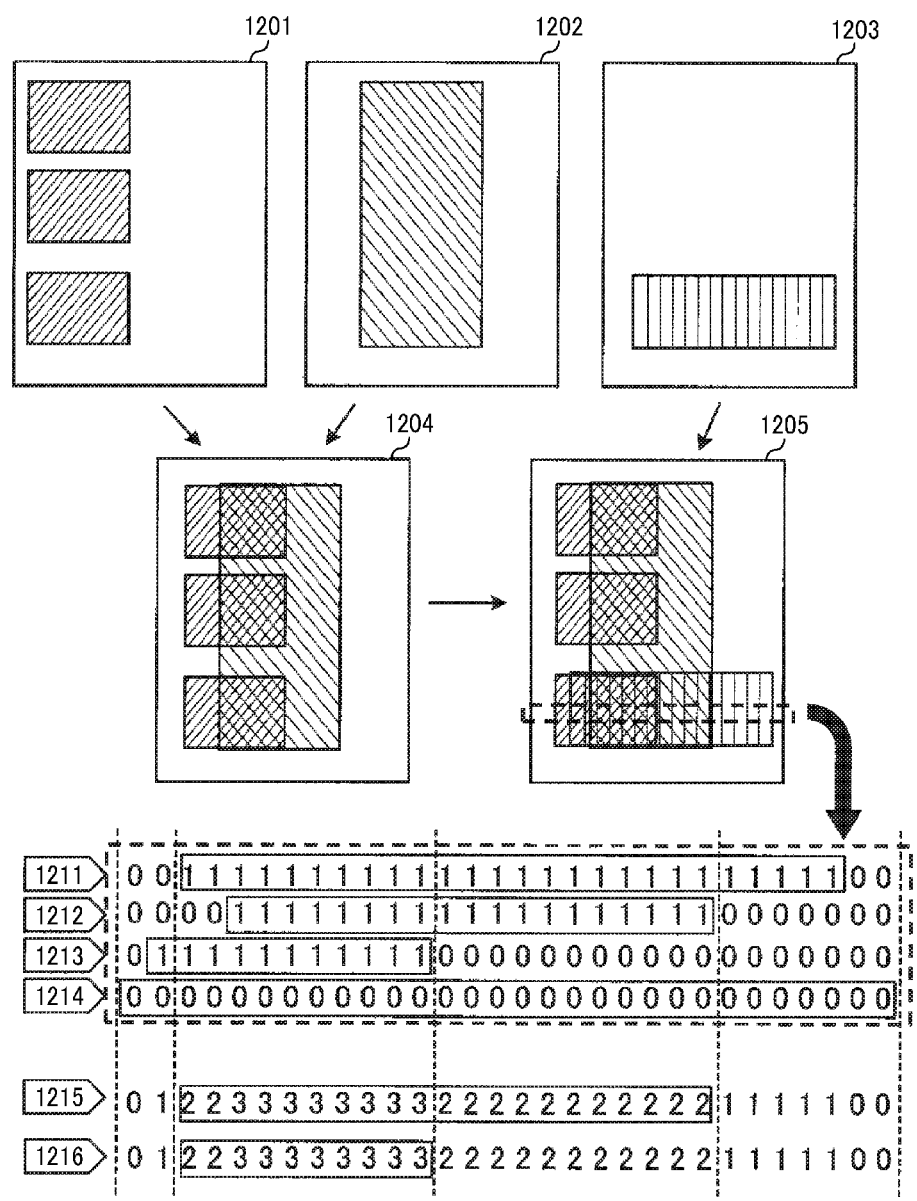
FIG. 13 is an illustration for describing an operation of consolidating the setting result of areas based on a plurality of feature elements to determine a text area according to an embodiment of the present disclosure.

In FIG. 13, the setting result of the text area based on a dividing line is illustrated with hatching in 1201. Further, the setting result of the text area based on a background dividing-line is illustrated with hatching in 1202. Further, the setting result of the text area based on a specific character is illustrated with hatching in 1203.

The reference number 1204 illustrates a state where 1201 and 1202 are combined. Further, the reference number 1205 illustrates a state where 1204 and 1203 are combined. In order to describe an overlapping portion in 1205, one line is picked up, and a portion to which the text area is set based on each of the feature elements is surrounded by a solid line and indicated by "1" (1211 to 1213). Specifically, in 1211, a portion to which the text area is set based on a specific character is surrounded by a solid line and indicated by "1". In 1212, a portion to which the text area is set based on a background dividing-line is surrounded by a solid line and indicated by "1". Further, in 1213, a portion to which the text area is set based on a dividing-line is surrounded by a solid line and indicated by "1". The reference number 1214 indicates data of which entire portion is set to "0" as a measure of a size of one line.

The values in 1211 to 1213 are summed coordinate by coordinate (1215, 1216), and the sum result are used for finally determining a text area.

The reference number 1215 illustrates an example in which the threshold is set to 2, and an area in which the sum result is 2 or more is set as a text area. In this example, a portion surrounded by a solid line is determined as a text area.

The reference number 1216 illustrates an example in which a priority level of the setting result of text area based on a dividing line is raised. In this example, a portion in which the sum result is 2 or more and the determination result is "1" in 1213 is surrounded by a solid line. This portion surrounded by a solid line is determined as a text area.

As described heretofore, the text area determination unit 212 in this embodiment performs, for each of the plurality of types of feature elements, the extraction of feature element and the setting of attribute with reference to the determination condition by the circuitry. The circuitry to set the attribute sums the attributes that are respectively set for the plurality of types of feature elements, and sets the attribute of each portion in the input image data based on the sum result.

In a case in which there is a large number of determination methods, a determination method whose priority is high is multiplied by a factor that in accordance with a priority level. The text area is determined depending on whether the sum of the values obtained by the multiplication is more than or equal to a threshold such as "2" in 1215. The threshold and the priority level are set in advance.

In the disclosure, the specific configuration of the apparatus, the specific steps in the operation, a data format, the specific content of data, the content, number or items of the determination conditions, etc. are not limited to the above description.

For example, when acquiring and processing regarding a text area based on the extraction of the plurality of feature elements, the text area is determined in consideration of priority of the features from among the plurality types of results or with conditions for setting a text area. This enhances the extensibility in a case in which the determination of text area is performed in a processing procedure other than that of the above-described embodiment. In addition, when a user interface is provided for enabling a user to set the conditions, operability for the user may improve.

Further, when acquiring the feature regarding a text area based on the extraction of a dividing line, a dividing line as a processing target may be determined as a dividing line in a newspaper, for example. This enables providing a condition with a determination attribute of the attribute information. Accordingly, a feature of a dividing line to be extracted in the extraction of dividing line may be specified to improve an accuracy of extraction.

Furthermore, when acquiring the feature regarding the text area based on the extraction of a background dividing-line, a line extending over the extracted dividing line may be assumed, and it may be determined whether a text area is set based on image data on the extended line. This enables keeping an accuracy of determination of a text area even at a position where a dividing line does not exist.

Still further, when acquiring the feature regarding a text area based on the extraction of a specific character, the text area may be determined based on font data. With this configuration, a certain specific character, which is likely to determined erroneously in the line extraction, is determined as a text area. Accordingly, an accuracy improves.

Still further, when extracting a plurality of types of feature elements, a user may determine priority indicating which type of feature element is to be extracted prior to another type of feature element. When the order of extraction of the feature elements is specified, a text area or a picture area is determined in accordance with the user intention.

Still further, when storing the determination conditions as information containing an extraction range and a determination result, the extraction range and the determination result may be acquired together with the determination conditions. In this case, the extraction range or the determination result may be determined based on the acquired information. This enables determining the extraction range or storing the determination result depending on the number of items of extraction criteria.

Still further, when storing the determination conditions as information containing a controlling operation of image processing, the controlling operation of image processing may be acquired together with the determination conditions. In this case, the image processing is controlled based on the acquired information. This enables changing the controlling operation depending on the number of items of extraction criteria.

Still further, the extraction criteria for extracting a type of document may be stored. In this case, a type of document such as a text document or a photograph document may be determined based on the extraction criteria. When the type of document is identified, the time taken for compression of a document in which a ratio of characters is high may be reduced. In addition, image processing depending on a type of document may be performed.

Still further, when the characteristics of text and a picture are distinguished from each other as characteristics of an image, different image processing may be performed on the text portion and the picture portion respectively. With this configuration, for image data in which an edge portion of text is thin and difficult to read, image processing may be performed to increase the density of the edge portion only in the text portion or to increase the density of the text itself. Accordingly, the text is made easy to read.

Still further, when the characteristics of an image are the characteristics of a document, image processing may be changed depending on the characteristics of document. Examples of a document whose background density is high and printed on a thin sheet of paper include a newspaper and advertisement. When the background density is very high or when the document is printed in duplex, show-through may occur and thereby text becomes difficult to read. Background correction processing or show-through removal processing may be performed on image data obtained by scanning a document having these characteristics to improve eligibility of text.

A program according to an embodiment of the present disclosure instructs a computer to control hardware to implement part of or the entirety of the functions of the MFP 100 in the above-described embodiment.

This program may be stored in advance in a ROM or any other suitable nonvolatile storage medium such as a flash memory and an electrically erasable and programmable read-only memory (EEPROM) included in the computer. Alternatively, this program may be stored in any suitable recording medium, such as a memory card, a compact disc (CD), a digital versatile disc (DVD), and a Blue-ray disc, for distribution. The program stored in at least any one of those recording medium may be installed in a computer executing the program to implement each steps described above.

Furthermore, the program may be downloaded from an external apparatus that is connected to a network and includes a storage medium storing the program or an external apparatus that is connected to a network and stores the program in a storage device. The downloaded program may be installed in a computer executing the program.

According to an embodiment of the present disclosure, it is possible to distinguish a text area from other areas with accuracy even in image data obtained by scanning a document whose background level is high such as a newspaper. It should be noted that an area to be detected in the image data may be any suitable area other than the text area.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An image processing apparatus, comprising:
a memory to store determination conditions; and
at least one processor or circuitry or a combination thereof configured to,
  acquire image data of a scanned document from a scanner,
  determine a document type of the scanned document from the image data,
  extract a feature element from the image data, the feature element selected from a plurality of feature element types, the plurality of feature element types including at least a dividing line element type, a virtual dividing line element type, a specific character element type, and a picture element type,
  determine whether the extracted feature element satisfied conditions defined in the determination conditions associated with the selected feature element type and the determined document type,
  set an attribute of an area of the image data corresponding to the extracted feature element based on the determination conditions, and
  compress the image data corresponding to the area based on the set attribute of the area.

2. The image processing apparatus of claim 1, wherein:
the image data includes a plurality of feature elements; and
the at least one processor or circuitry or the combination thereof is further configured to,
  extract each of the plurality of feature elements from the image data,
  determine the feature element type of each of the plurality of feature elements types, and set the attribute of the area associated with each of the plurality of feature elements based on the determined feature element type corresponding to the extracted feature element, respectively;

calculates a sum of attributes that are set for each respective feature element type included in the image data; and set the attribute of each area of the image data corresponding to each of the plurality based on the calculated sum.

3. The image processing apparatus of claim 2, wherein the at least one processor or circuitry or the combination thereof is further configured to:

performs, for each of the extracted plurality of feature elements, the setting of the attribute based on a processing target in a specific order.

4. The image processing apparatus of claim 2, wherein one of the extracted plurality of feature elements is the dividing line element type.

5. The image processing apparatus of claim 2, wherein:
the plurality of extracted feature elements includes a specific character element type feature element; and
an area in the image data from which the specific character is to be extracted is defined relative to a position of a previously extracted feature element of a type other than the specific character element type based on the determination conditions.

6. The image processing apparatus of claim 2, wherein:
the plurality of extracted feature elements includes a dividing line element type feature element and a virtual dividing line element type feature element-line; and
the at least one processor or circuitry or the combination thereof is further configured to,
extracts the dividing line feature element from the image data, and
extract the virtual dividing line feature element from an area extending over the extracted dividing line feature element.

7. The image processing apparatus of claim 1, wherein the image data is constructed of a plurality of sub-areas, each of the sub-areas including at least one of the plurality of feature elements; and
the at least one processor or circuitry or the combination thereof is further configured to perform image processing on each sub-area of the image data, the image processing varying based on the attribute set for each sub-area.

8. The image processing apparatus of claim 7, wherein the image processing includes processing to emphasize text characters on a sub-area of which attribute is set to a text area.

9. The image processing apparatus of claim 1, wherein the at least one processor or circuitry or the combination thereof is further configured to:
decompress the compressed image data, the compressed image data including a plurality of extracted feature elements;
perform image processing on the decompressed image data based on the set attribute associated with each of the plurality of extracted feature elements; and
print a result of the image processing.

10. The image processing apparatus of claim 1, wherein the at least one processor or circuitry or the combination thereof is further configured to perform the compression of the image data corresponding to the area by changing a compression ratio based on the feature element type of the area and the determined document type.

11. The image processing apparatus of claim 7, wherein the image processing includes processing to increase a density of an edge portion of a sub-area of which attribute is set to a text area.

12. The image processing apparatus of claim 7, wherein the image processing includes processing to increase a density of characters included in a sub-area of which attribute is set to a text area.

13. A method of processing an image, comprising:
acquiring, using at least one processor, image data of a scanned document from a scanner;
determining, using the at least one processor, a document type of the scanned document from the image data;
extracting, using the at least one processor, a feature element from the image data, the feature element selected from a plurality of feature element types, the plurality of feature element types including at least a dividing line element type, a virtual dividing line element type, a specific character element type, and a picture element type;
determining, using the at least one processor, whether the extracted feature element satisfies conditions defined in determination conditions associated with the selected feature element type and the determined document type;
setting, using the at least one processor, an area of the image data corresponding to the extracted feature element based on the determination conditions;
setting, using the at least one processor, an attribute of the area based on the determination condition; and
compressing, using the at least one processor, the image data corresponding to the area based on the set attribute of the area.

14. A non-transitory computer-readable storage medium storing a computer-executable program which, when executed by at least one processor, causes the at least one processor to:
acquire image data of a scanned document from a scanner;
determine a document type of the scanned document from the image data;
extract a feature element from the image data, the feature element selected from a plurality of feature element types, the plurality of feature element types including at least a dividing line element type, a virtual dividing line element type, a specific character element type, and a picture element type;
determine whether the extracted feature element satisfied conditions defined in the determination conditions associated with the selected feature element type and the determined document type;
set an area of the image data corresponding to the extracted feature element based on the determination conditions;
set an attribute of the area based on the determination conditions; and
compress the image data corresponding to the area based on the set attribute of the area.

* * * * *